United States Patent [19]

Ferdinand et al.

[11] Patent Number: 4,918,492

[45] Date of Patent: Apr. 17, 1990

[54] MICHAELSON OPTICAL FIBER INTERFEROMETER AND ITS APPLICATION IN PARTICULAR IN THE MEASUREMENT OF TEMPERATURES

[75] Inventors: Pierre Ferdinand, Houilles; Chieh Liu, Paris, both of France

[73] Assignee: Electricite de France - Service National, Paris, France

[21] Appl. No.: 172,529

[22] Filed: Mar. 24, 1988

[30] Foreign Application Priority Data

Mar. 24, 1987 [FR] France ................. 87 04089

[51] Int. Cl.$^4$ ............................................. G01B 9/02
[52] U.S. Cl. ......................................... 356/345; 356/43; 374/161
[58] Field of Search ................. 356/345, 43, 44; 250/227; 374/131, 161

[56] References Cited

U.S. PATENT DOCUMENTS

| | | |
|---|---|---|
| 4,596,466 | 6/1986 | Ulrich . |
| 4,627,728 | 12/1986 | Willson .............................. 356/345 |
| 4,755,668 | 7/1988 | Davis ................................. 356/345 |

FOREIGN PATENT DOCUMENTS

| | | |
|---|---|---|
| 0211804 | 2/1987 | European Pat. Off. . |
| 8503124 | 7/1985 | PCT Int'l Appl. . |
| 8701438 | 3/1987 | PCT Int'l Appl. . |

OTHER PUBLICATIONS

"Passive Multiplexing System for Fiber Optic Sensors", Nelson et al., Applied Optics, 9-1980, pp. 2917-2920.

Primary Examiner—Vincent P. McGraw
Assistant Examiner—S. A. Turner
Attorney, Agent, or Firm—Sughrue, Mion, Zinn, Macpeak & Seas

[57] ABSTRACT

The interferometer comprises an emitter arm (10) excited by a source (11) and a receiver arm (20) associated with a photodetector (21) united by an optical coupler (50) so as to form a reference arm (30) and a measurement arm (40) terminating in a sensor (41). The arms (30) and (40) are constituted by one and the same optical fiber whose diopter of its free end (31) acts as a partially transparent mirror for the reference optical wave. This end (31) is coupled to the sensor (41) which returns the measurement optical wave through said diopter. Application in particular in the measurement of temperatures, for example in turbo-machines or of fluctuations of flow density.

11 Claims, 3 Drawing Sheets

MICHAELSON OPTICAL FIBER INTERFEROMETER AND ITS APPLICATION IN PARTICULAR IN THE MEASUREMENT OF TEMPERATURES

BACKGROUND OF THE INVENTION

The present invention relates to metrology and more particularly to metrology which employs interferometric optical techniques. The invention more particularly relates to an improved Michelson optical fiber interferometer and its application in particular in the measurement of temperatures in flows for example within turbomachines.

Metrology which employs interferometry is well known. This technique, which employs interferences produced between a reference wave and a measured wave which is affected by the phenomenon to be studied, is characterized by its very high sensitivity.

Ever since optical fibers have been of utility for technical purposes, it has already been proposed to use them for constructing for example Michelson or Mach-Zehnder interferometers. The use of optical fibers for interferometers has permitted the construction of apparatus which are insensitive to electromagnetic fields, have low propagation losses, are practically immune to chemical attack and moreover have compact dimensions and low mass.

As is known, interferometry permits translating an optical difference of operation between a reference wave and a measured wave into a phase difference. This phase difference $\phi$ is equal to $$\phi = 2n \frac{\Delta}{\lambda}$$

where:

$\lambda$ is the wavelength of the radiation employed,
$\Delta$ is the optical difference of operation with $\Delta = nl$,
$\eta$ is the index of refraction of the medium, and
$l$ is the geometrical difference between the optical paths of the reference and measured waves in their respective arms.

In the case where there are employed a reference arm (r) and a measurement arm (m), there is strictly obtained $$\Delta = n_r l_r - n_m l_m.$$

Any phenomenon which has an action on the geometrical difference $l$ of the two optical paths and/or on the index of refraction n of the measurement arm or on the index of the reference arm, therefore results in a variation in the optical difference of operation. This property is employed for revealing physical phenomena and in particular temperature variations.

In order to guard against disturbances which may affect the reference arm and the measurement arm outside the measuring zone, i.e. the optical head, and thus render the results inaccurate, it has already been proposed to employ, for constituting the arms, optical fibers which are associated with each other by means of optical couplers which perform the function of semi-reflecting and semi-transparent separating plates usually employed in conventional interferometers. It is then possible to join the optical fiber of the reference arm and the optical fiber of the measurement arm in such manner that these fibers are subjected to the same environment in the major part of their length and that only the end section, in the vicinity of the free terminal part, of the optical fiber of the measurement arm is subjected to the phenomenon which is desired to be evaluated. The two diopters of the end faces of the optical fibers of the measurement arm and of the reference arm act as mirrors. For this purpose, they are usually metallized by any suitable conventional method.

This type of Michelson interferometer employing optical fibers is delicate to use and the quality of the measurements does not attain the theoretical performances one would expect.

Indeed, even if the measurement arm and reference arm fibers extended side-by-side through similar media, except for the terminal part of one thereof, they exhibit particular differential disturbances which are peculiar thereto and which are due to for example the ambient temperature and the mechanical stresses to which they are subjected. These disturbing phenomena merely translate the heterogeneities of the optical fibers and/or of the ambient medium. Particularly well stabilized temperatures, especially at the core of the optical fibers, must be in particular obtained. If good sensitivity is desired, calculations show that the temperature of the two optical fibers must be stabilized at least to within 0.2K and that the difference between the lengths of the optical fibers of the two arms must not exceed 3.50 mm.

These difficulties are particularly bothersome when it is desired to employ an optical fiber interferometer and, in particular, a Michelson interferometer for measuring temperatures.

As is known, the temperature of a flowing fluid it is desired to measure, and in particular of a gas in a measuring stream where the fluid is travelling at a certain velocity, is lower than the real temperature of the probe since the extraneous heating of the probe due to the flow itself is proportional to the square of the velocity of the fluid. When a fluid travelling at a relatively high velocity passes through the stream, it is found that this difference may be relatively large.

The difficulty of measuring temperature by means of a probe directly plunged into the fluid under study is therefore clear. This is why an interferometric technique is employed, consequently without physical contact with the medium to be measured which permits translating changes in temperature into variations in the index of refraction of the medium The measurement of temperatures of a flowing fluid is required for example in particular in turbo-machines employed for producing electric power in which the fluid is steam which sometimes contains suspended droplets and in which a miniature probe must be employed in order to avoid disturbing the flow and also owing to lack of space.

SUMMARY OF THE INVENTION

An object of the invention is to overcome the aforementioned drawbacks of the known technique.

The invention provides a preferably single-mode (or unimodal) Michelson optical fiber interferometer in which an emitter arm excited by a source of light and a receiver arm associated with a photodetector are joined by a single-mode optical coupler in order to form a reference arm and a measurement arm terminating in a sensor of the physical phenomenon to be evaluated. In this interferometer, its reference arm and its measurement arm are constituted by one and the same optical fiber, the diopter of the end of said optical fiber remote from the optical coupler acts as a partially transparent mirror for the reference optical wave and said end is coupled to the sensor which returns the measurement optical wave through the diopter.

According to another feature of this improved interferometer according to the invention, the sensor employed comprises a cell which has two opposed faces defined by transparent diopters which are parallel to each other and between which the physical phenomenon to be evaluated takes occurs, and a mirror parallel to said end of the optical fiber for returning the measurement optical wave to its diopter, said cell being interposed between said end of the optical fiber and said mirror.

According to another feature of the invention, the mirror of the sensor which returns the measurement optical wave is carried by a phase modulator vibrating at a relatively low frequency with, if need be, interposition of a compensating element and the photodetector of the receiver arm is associated with an electric circuit for extracting from the signal it produces its component whose frequency is double that of the phase modulator and which is reinjected into the modulator for compensating for stability deviations of the sensor and in particular those of its cell so as to obtain a zero dynamic synchronous detection.

The interferometer according to the invention has in particular an application for example in the measurement of temperatures and for example the temperatures prevailing in turbo-machines.

BRIEF DESCRIPTION OF THE DRAWING

Other features of the invention will be apparent from the following description and claims with reference to the accompanying drawing which is given solely by way of example and in which:

DETAILED DESCRIPTION OF PREFERRED EMBODIMENTS

Interferometers, and in particular those employing optical fibers, are well known in the art. This is particularly the case when these interferometers are constructed in accordance with the configuration known under the name of Michelson. For this reason, one will not dwell upon what is conventional to any length and merely what characterizes the invention will be brought out.

Figure 1:
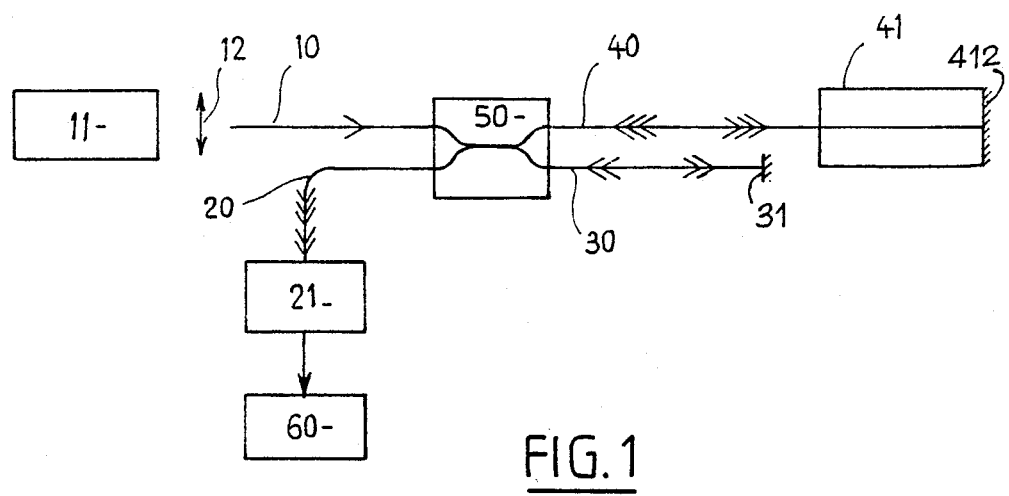
FIG. 1 is a diagrammatic view of an embodiment of a Michelson optical fiber interferometer according to the prior art.

In FIG. 1, there has been diagrammatically shown a single-mode Michelson optical fiber interferometer. This interferometer comprises an emitter arm 10, one of the ends of which is excited by a source of light 11, such as a laser, whose emission is, if need be, focused by means of a lens 12 onto the free end of an optical fiber. This interferometer further comprises a receiver arm 20 made from an optical fiber and associated with a photodetector 21. The optical fibers of the emitter arm 10 and receiver arm 20 are locally united by an optical coupler 50 so as to form a reference arm 30 and a measurement arm 40 which terminates in a sensor 41 sensitive to the physical phenomenon to be evaluated (temperature, pressure, density, etc.). As is conventional, the measurement and reference arms are so arranged that the diopters at the free end of the optical fibers concerned behave in the manner of a totally reflecting mirror as diagrammatically represented.

The optical coupler 50 performs the function of a conventional semi-transparent and semi-reflecting separating plate. The optical couplers are manufactured in the conventional manner. They are for example obtained by cleaning and by a local fine polishing, then put into contact with each other, or by a localized fusion. The reference optical wave (> >) and the measurement wave (> > >) obtained by separation of the incident wave (>) in the coupler are recombined after reflection in the coupler and they interfere and form interference fringes which are transmitted through the optical fiber of the receiver arm 20 where they are detected by the photodetector 21 whose signal is sent to an electric circuit 60 which permits using this signal.

Figure 2:
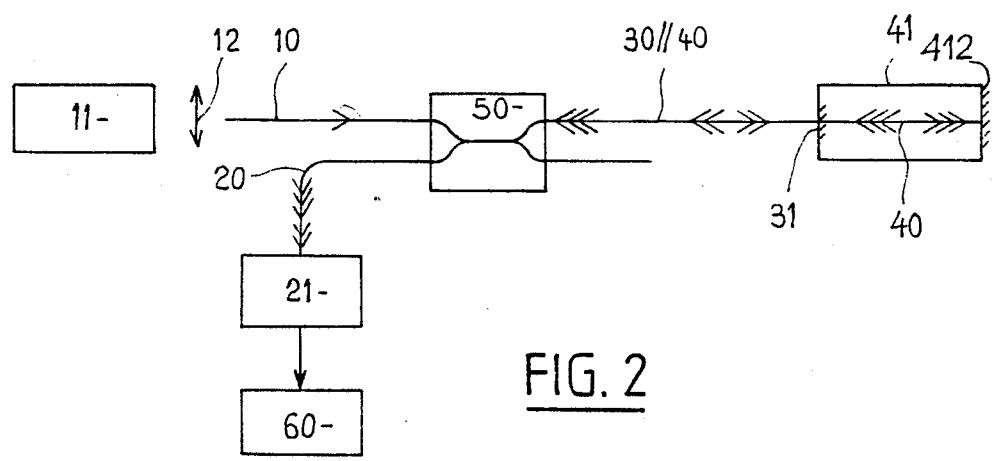
FIG. 2 is a view similar to FIG. 1 of an improved Michelson optical fiber interferometer according to the invention.

Reference will now be made to FIG. 2 where an improved Michelson optical fiber interferometer according to the invention is represented.

In this FIG. 2, like component elements are designated by like reference numerals.

It can be immediately seen from FIG. 2 that the reference arm 30 and the measurement arm 40 are united into the same optical fiber 30/40 whose end 31 is no longer a totally reflecting diopter but a partially reflecting diopter. This end is finely polished; if it is placed in the air and if its index of refraction is 1.5, it has, as known, a factor of reflection on the order of 4%. It is clear that this value may be modified by an appropriate treatment, for example by deposition under a vacuum of thin layers of substances for obtaining the required value.

A part (> >) of the incident wave (>) is reflected on the diopter of the end 31 and forms the reference wave and the remainder (> > >) of the wave then propagates in the sensor 41 where it is totally reflected on the end mirror 412 and forms the measurement wave in the conventional manner.

Thus, it can be seen that in this improved arrangement according to the invention, the single optical fiber 30/40 conducts both the reference wave (> >) and the measurement wave (> > >) which interfere.

If the end 31 has the factor of reflection just indicated, the reference wave and the measurement wave have dissimilar intensities which are in the ratio of about 4/96; this is not favorable to good visibility of the fringes which are then relatively only slightly contrasted. This is why it has been indicated that the terminal diopter of the end 31 may be treated.

Figure 3:
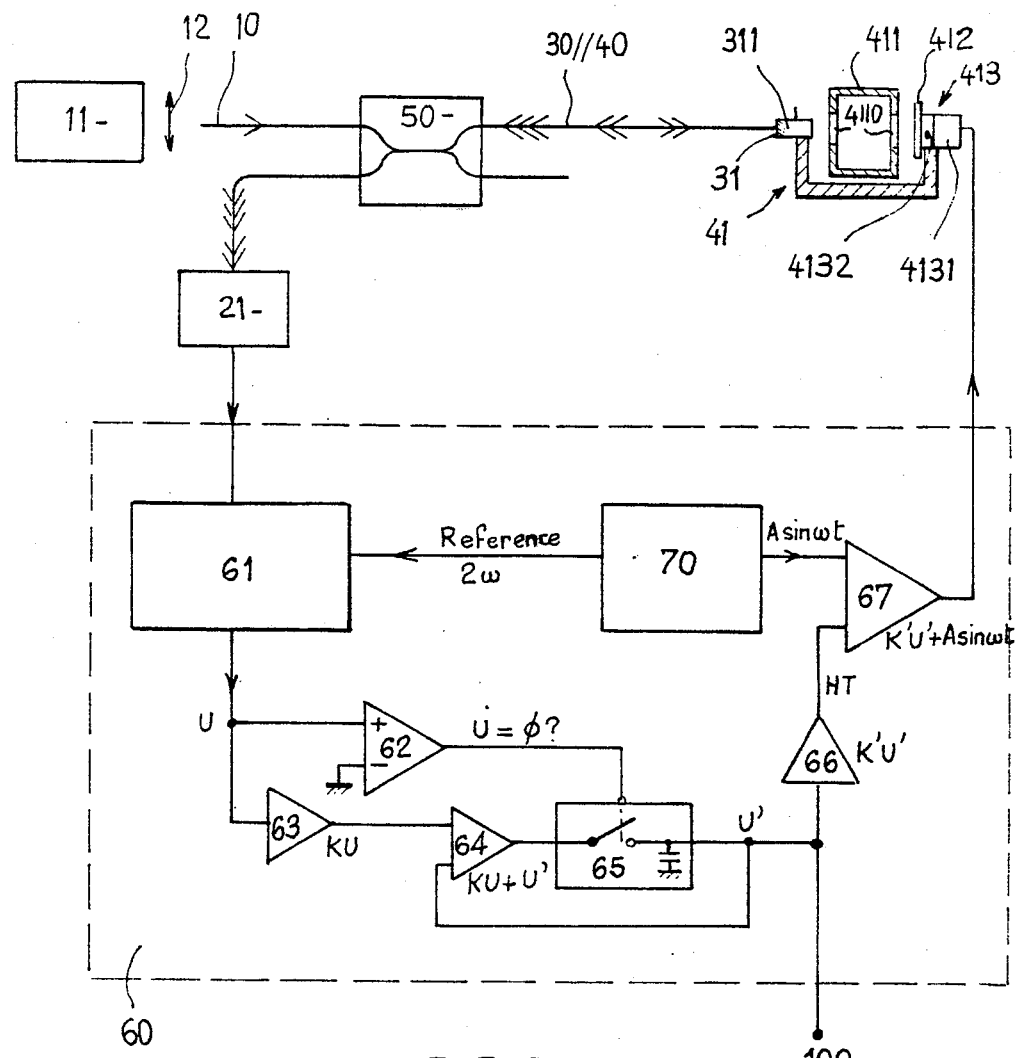
FIG. 3 is a diagrammatic view illustrating features which pertain to the invention.

According to the invention, the single optical fiber 30/40 terminates in the sensor 41 which comprises a cell 411 having two opposed faces defined by transparent diopters 4110 which are parallel to each other and between which the physical phenomenon to be evaluated occurs; these diopters 4110 are also preferably parallel to the end 31 of the optical fiber which serves partially as a mirror. If need be, the end 31 is associated with the sensor 41 through an appropriate optical element 311, for example a collimator such as a "Selfoc" lens of the firm Nippon Sheet Glass Co. Ltd. This optical element has for purpose to render parallel the divergent beam issuing from the fiber and to reinject it after reflection on the mirror. Any other conventional optical element may be employed, but this chosen one is most suitable owing to its small size, the beam issuing therefrom having a diameter of about 1.8 mm. The mirror 412 parallel to the end 31 of the optical fiber is used for returning the measurement wave (>>>) onto this end. As can be seen in FIG. 3, the cell 411 is interposed between the end 31 and the mirror 412 The fluid whose temperature is desired to be measured for example circulates in the cell. As is known, the temperature modifies the index of reflection of the medium and it is sufficient to follow the modifications in the interference fringe network to measure the changes in the index and therefore to deduce therefrom the temperature variations. Indeed, $$\frac{d\phi}{dT} = k\frac{d\Delta}{dT} = k\frac{d\Delta'}{dT} = k\left[n\frac{dl}{dT} + l\frac{dn}{dT}\right]$$

in which $\Delta'$ represents the optical difference of operation merely in the measuring head, the remainder being exactly identical for the two paths and therefore without effect. It is sufficient to maintain l insensitive to temperature.

It can therefore be seen that owing to the invention, the Michelson interferometer has only a single physical arm constituted by one and the same fiber 30/40. It will therefore be understood why all the differential problems which might exist between the fibers of the measurement arm 40 and the reference arm 30 of the conventional Michelson interferometer are eliminated, since only a single fiber is used where the anomalies affect in a strictly equal manner the reference wave (>>) and the measurement wave (>>>) which travel through this fiber in an exactly identical manner.

Moreover, it will be observed that, since the measurement wave (>>>) passes through the sensor twice, one benefits from an amplification of factor 2.

As the interferometer is sensitive to the difference of the optical paths between the measurement wave and reference wave, all the disturbing effects due to the environment and acting on the fiber are eliminated, since the reference wave and measurement wave are subjected thereto simultaneously and in the same manner. It is therefore possible by means of the invention to detect the variation in the optical path due solely to the sensor independently of the environment.

In order to still further improve the sensitivity of this improved interferometer according to the invention, it is particularly advantageous to arrange that the sensor 41 be associated with a phase modulator 413. In this case, the mirror 412 is mounted on piezoelectric ceramic 4131 controlled by a low frequency generator 70, for example a 20 kHz generator.

To obtain optimum results, there is employed a synchronous detection with a dynamic zero of the optical signals, which is effected by an electric circuit 60 with which the generator 70 is associated.

The circuit 60 comprises a phase-locking amplifier 61, a comparator 62, a variable gain amplifier 63, an adder 64, an analog memory 65, an operational amplifier 66 and an adder 67.

For this purpose, there is extracted from the signal received by the photodetector 21 a component whose frequency is double that of the low frequency phase modulation due to the generator 70 and the current is measured; this produces a synchronous detection.

This measured current is then shaped and re-injected in the form of a high voltage into the piezoelectric ceramic of the modulator so as to automatically compensate for the variations in the optical paths thermally induced in the stream. The sensitivity of the interferometer according to the invention is therefore constant and optimum, since it operates in accordance with a zero method.

The signal emitted by the photodetector 21 which is excited by the interference fringes is processed in the following manner.

The signal I(t) received by the photodiode 21 is of the form:

$$I(t) = I_o' + I_o \cos(\Delta\phi + \alpha\cos\omega t) \quad (1)$$

where $\phi, \omega$ are the amplitude and the frequency of the low-frequency phase modulation, $\Delta\phi$ is the overall phase difference which is the sum of the initial phase difference $\Delta\phi_o$ of the two waves of the interferometer and the phase shift $\Delta\phi_T$ created by the temperature variation in the measuring head.

By developing the relation (1) into Fourier's series, the terms of the first and second harmonics are obtained:

$$I_1(t) = 2I_oJ_1(\alpha)\sin\Delta\phi\cdot\cos\omega t$$

$$I_2(t) = -2I_oJ_2(\alpha)\cos\Delta\phi\cdot\cos 2\omega t$$

where $J(\alpha)$, $J_2(\alpha)$ are Bessel functions.

For t=0 (no original temperature variation), there is obtained $\Delta\phi = \Delta\phi_o$. By adjusting the mean position of the piezoelectric ceramic about which it oscillates with a voltage $V_o$, one may write:

$$\Delta\phi_i = 2n\pi + \frac{\pi}{2} \quad (n = 0, \pm 1, \pm 2, \ldots).$$

In this case, $I_2(t)$ is equal to zero.

For t>0 (a temperature variation $\Delta T$ subsequently appears in the measuring head of the sensor), one obtains a value of $\Delta\phi_T$ different from zero, thus:

$$\Delta\phi = 2\eta\pi + \pi 2 + \Delta\phi_T.$$

and $A_2$ the amplitude of the term in $2\omega$ is written in the form:

$$A_2 = -2I_o J_2(\alpha)\cos\left(2n\pi + \frac{\pi}{2} + \Delta\phi_T\right) \cdot 2 I_o J_2(\alpha)\sin\Delta\phi_T \quad (2)$$

In order to detect this additional phase difference $\Delta\phi_T$ there is added, or subtracted, a voltage $\Delta V$ applied to the piezoelectric ceramic so that $A_2$ is always equal to zero.

This voltage $\Delta V$, which is a signal of the negative feedback, permits knowing, to within a coefficient, the temperature variation $\Delta T$ in the measuring cell of the sensor 41.

The advantage of the method of zero dynamic synchronous detection according to the invention is to present a constant and maximum sensitivity and a very wide measuring range.

This synchronous detection technique with a dynamic zero is carried out with the aid of the circuit 60 a particular embodiment of which comprises the following components which operate as mentioned.

The low frequency generator 70 permanently supplies the piezoelectric ceramic 4131 with a sine signal of the form A sin (2 ft) through the adder circuit 67. f is chosen to be very close to 20 kHz to ensure the phase modulation required for detecting the signal.

The frequency of 20 kHz is not at all critical and it may be chosen otherwise provided that the piezoelectric ceramic is capable of responding to the chosen frequency and the phase-locking amplifier 61 is capable of being locked onto 2f which is double this frequency. The choice of 20 kHz is due to the fact that this frequency is easily electronically "processable" and that it is not "too low", which would increase the response time of the detector.

The reference emitted by the generator 70 is in fact a frequency reference of the same type as before.

A sin (2 πft).

Generally, when a commercially-available generator is used for component 70, the "synchro" output is used as the frequency reference; this is not obligatory since the reference signal may come exactly from the same output as the first signal employed for controlling the piezoelectric ceramic 4131.

It will be observed that the phase-locking amplifier 61 in the chosen circuit is locked onto 2f which is double the frequency delivered by the generator 70. In the case where the phase-locking amplifier 61 does not possess internally the possibility of being locked onto the harmonic 2 of the reference signal, a conventional frequency doubling circuit should be interposed between the generator 70 and the amplifier 61.

The phase-locking amplifier 61 (or synchronous amplitude detection or lock-in) accepts several forms of frequency reference signals (for example, square, sinusoidal . . . ). Its function is to create a very narrow filter around the reference frequency and to deliver the amplitude of the signal at this reference frequency and to deliver the amplitude of the signal at this frequency contained in the imposed signal at the input of the circuit. A commercially-available apparatus is employed, but there is nothing to prevent the construction of a specialized card performing this function.

The comparator 62 is in fact associated with two electronic comparators (of LM 208 or like type) which supervise the output voltage of the amplifier 61 which must remain nil. If this condition is not respected, the comparators cause actuation of the error correcting device (63, 64, 65 and 66).

The variable gain amplifier 63 provides an optimum control. A circuit of the EXAR Integrated System Incorporation XR 2208 or like type is used.

The adder 64 is a summing circuit of A 741 or like type.

The analog memory 65 (sample and hold) is for example of the Datel SHM 20 or like type validated for the comparator 62. It delivers a voltage equal to that delivered by the adder plus a voltage proportional to V.

The high voltage delivered by the operational amplifier 66 is a negative feedback signal which is therefore strictly speaking not a signal of pure shape (sinusoidal, square . . .), but rather a "continuous level" which changes constantly as a function of the signal delivered by the phase-locking amplifier 61. The output 100 is a measure-taking terminal.

The voltage Vo is the continuous voltage delivered by the adder 67 at time t=o, when temperature variations induced in the measuring head are assumed to be absent. ΔV is the negative feedback signal generated by the whole of the negative feedback chain and the adder 67. This signal is added to or subtracted from the preceding voltage (Vo at the origin) so as to permanently compensate for temperature variations induced in the measuring head.

The operational amplifier 66 is a high-voltage continuous/continuous converter of the trademark RCA type PF 1041 P.

The adder 67 is constructed with passive components.

In order to obtain measurements of good quality which are reliable and sensitive, the sensor 41 must have a very high dimensional physical stability to avoid thermal effects which in particular act on the distance between the two opposed diopters 4110 of the cell 411.

Supports composed of Invar are for example employed and the thermal variations due to the change in the length and in the index of the components which are part of the construction of the measuring head ("Selfoc", ports, mirror . . . ) are auto-compensated by the thermal expansion of the piezoelectric ceramic which acts in the opposite direction. If this is found to be insufficient, there is interposed between the mirror and the piezoelectric ceramic an element 4132 of a suitably chosen metal (for example Al) whose thickness is so calculated as to cancel out the thermal variations of the head. In fact, there is obtained:

$$\frac{d}{dT} \text{ (index and length of "Selfoc", ports, exterior air, mirror)} =$$

$$\frac{d}{dT} \text{ (piezoelectric ceramic + element of Al)}$$

The improved interferometer according to the invention was employed for effecting the measurements of temperature in a stream in which steam circulates. A precision of measurement of the temperature on the order of half a degree and a relatively rapid response time less than about a second were obtained. These performances were obtained for a measuring range on the order of 50° in respect of temperatures between about 10° C. and 60° C. It is easy to increase this measuring range electronically by shifting the origin: when a limit (for example upper limit) of the measuring range is reached, a downward shift of half a measuring range is introduced, and consequently, the point of operation at the middle of the new measuring range is reset. Thus, it is easy to obtain a measuring range which is as large as desired, but it is clear that nothing would prevent the use of this interferometer for other uses and with different amplitudes and ranges with the same precision and with the same response time.

The sensor proper may be constructed in a very compact form and it will be understood that it is easy to insert it for example in a turbo-machine without disturbing the flow, for ascertaining the field of its internal temperatures and thus obtaining an idea of the real distribution and magnitude of the losses. Such items of information permit an improved modelling of the phenomena for optimizing the materials.

Figure 4:
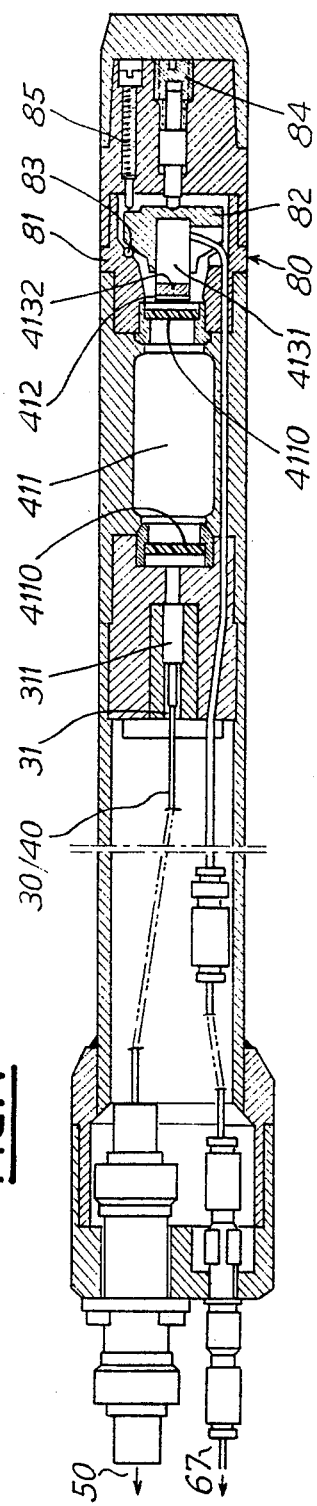
FIG. 4 is a simplified longitudinal sectional view of an embodiment of a sensor of a Michelson optical fiber interferometer according to the invention which is in the form of a cylindrical probe tube.

FIG. 4 illustrates an embodiment of a sensor of a Michelson optical fibre interferometer according to the invention. This embodiment is in the form of a cylindrical probe tube whose maximum outside diameter is on the order of about 25 mm and whose length may vary between about 2.1 m and 3.6 m, depending on the versions.

This figure represents a simplified longitudinal section. The mechanical assemblies and arrangements are conventional and include seals in the appropriate places; likewise, the electrical and optical connections are achieved with conventional connectors. Those skilled in the art will be capable of choosing the solutions suitable for the envisaged purposes and applications and the possible chemical and/or thermal treatments of the components. This is why the description of this embodiment will be limited to that which directly concerns the invention.

As can be seen, the sensor 41 comprises a cell 411 made for example from superior Invar. In this cell, the diopters 4110 are mounted with the aid of a barrel and clamping ring and interposition of a seal; this type of assembly is conventional in optics and these components therefore do not carry reference numerals. The rings and barrels are for example made from superior Invar and the seal from "Teflon".

The diopters 4110 are ports made from plates having parallel faces, a thickness of 1 mm and a diameter of about 9 mm. These plates are polished and trued up, and the homogeneity of the material is so chosen that they present the required interferometric optical quality. Special SCHOTT AK 11 and AF 22 glasses are for example used which present opposed thermo-optical constants G $$G = \alpha(n - 1) + \frac{dn}{dT}$$

Thus, the variations in the index and thickness of the ports resulting from possible thermal gradients which might disturb the optical path are eliminated.

The phase modulator 413, with its piezoelectric ceramic 4131 and its element 4132, and the mirror 412 are placed in a mount 84. The latter comprises essentially a body 81 and a support 82 separated by balls 83, for example three balls, in order to constitute a spherical articulation. The balls 83 bear between a female cone of the body 81 and a male spherical bearing surface of the support 82. A spring-biased push member 84 defines the center of rotation and the orientation is adjusted and fixed by means of three equidistant spring-biased screws 85. This spherical articulation therefore ensures the return of the light which has travelled through the measuring head twice in the optical fibre. This adjustment is effected once before the experiments and it may be repeated in the event of misadjustment.

All the metal components are for example made from superior Invar, the element 4132 from aluminium AUG4 and the piezoelectric ceramic carries the reference P.249.2 manufactured by PHYSIK INSTRUMENTE.

Figure 4A:
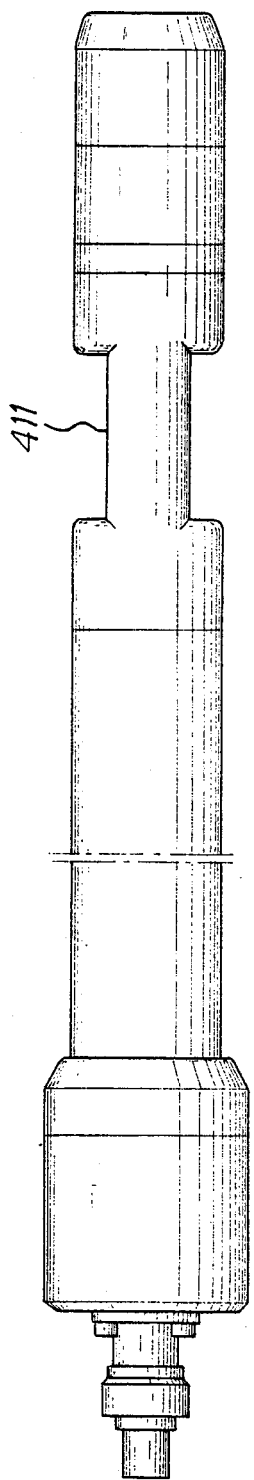
FIG. 4A is an elevational view of the embodiment of FIG. 4, turned through a quarter of a turn, showing the configuration of the sensor cell.

The configuration of the cell proper is so chosen as to substantially avoid disturbing the flow in the measuring stream. This configuration is clear from FIG. 4 and FIG. 4A. In this way, an interior width on the order of 13 mm is obtained.

Owing to the chosen construction, it can be seen that the cell may be very easily changed and the geometry and/or the profile of the cell may be therefore adapted to the case to be studied without having to modify the whole of the embodiment of the probe tube according to the invention.

This interferometer according to the invention has other applications: for example, it may be used in acoustics for studying fluctuations in density in flows since the voluminal mass of a fluid is directly proportional to its index of refraction.

What is claimed is:

1. A Michelson optical fiber interferometer for measuring the temperature of a flowing fluid and comprising an emitter arm, a source of light for exciting the emitter arm, a receiver arm, a photodetector associated with the receiver arm, an optical coupler uniting said emitter arm and said receiver arm so as to form a reference arm and a measurement arm, a sensor of the physical phenomenon to be evaluated terminating said measurement arm, said reference arm and said measurement arm being constituted by one and the same single mode optical fiber for carrying only a reference wave and a measuring wave interfering together and having a free end opposed to said optical coupler at which free end a diopter acts as a partially transparent mirror which reflects less than one-half of the impinging reference optical wave and is coupled to said sensor which sensor returns the measurement optical wave through the diopter, wherein said sensor comprises a hollow and open cell which has two opposed faces defined by transparent diopters which are parallel to each other and between which at least a part of said flow fluid is received, and a mirror parallel to said end of said optical fiber for returning the measurement optical wave through said diopter of said end of said optical fiber, said cell being interposed between said end of said optical fiber and said mirror and having a substantially constant length insensitive to thermal changes.

2. An interferometer according to claim 1, wherein a compensating element is located behind, and carries, said mirror.

3. An interferometer according to claim 2, wherein a phase modulator is fixed to said compensating element at a point on a side opposite to that carrying said mirror, and wherein the fixing point is such that the combination of said modulator and said mirror intrinsically effects a compensation of thermal variations of the physical length of the path between the two diopters of said cell.

4. An interferometer according to claim 3, wherein said phase modulator is a piezoelectric ceramic.

5. An interferometer according to claim 4, wherein a low frequency generator is connected to feed said phase modulator.

6. An interferometer according to claim 4, wherein a low frequency generator is connected to feed said phase modulator.

7. An interferometer according to claim 3, wherein a low frequency generator is connected to feed said phase modulator.

8. An interferometer according to claim 7, wherein said photodetector is associated with an electric circuit for extracting from a signal delivered by said photodetector a component thereof whose frequency is double the frequency of the low frequency generator for measuring the current of said component, for shaping it and for re-injecting it into said modulator for the purpose of compensating for the evolution of the optical path of the cell and thereby obtain a synchronous detection having a zero dynamic.

9. An interferometer according to claim 2, wherein said fluid flow is a gas such as dry air or steam.

10. An interferometer according to claim 1, wherein an optical element is interposed between said end of said optical fiber and said sensor.

11. An interferometer according to claim 10, wherein said optical element is a lens of the type performing a collimation function (e.g. "Selfoc").

* * * * *